United States Patent Office 3,490,930
Patented Jan. 20, 1970

3,490,930
REFRACTORY COMPOSITION
Jacques R. Martinet, San Jose, Calif., assignor to Kaiser Aluminum & Chemical Corporation, Oakland, Calif., a corporation of Delaware
No Drawing. Filed Aug. 7, 1967, Ser. No. 658,622
Int. Cl. C04b 17/02
U.S. Cl. 106—58      8 Claims

ABSTRACT OF THE DISCLOSURE

This application concerns a refractory composition suitable for gunning and particularly it relates to a basic refractory gunning mix comprising periclase or chromite or mixtures of periclase or chromite granular material with a cold or chemical bonding agent which enables the production of a slurry mix and which ensures improved adherence of the granular material to the gunned surface, such a bondng agent comprising from 1% to 5% of a hydrated alkali metal borate and from 1% to 5% of a swelling clay.

BRIEF SUMMARY OF THE INVENTION

It has become established procedure to apply many refractory compositions in furnace linings or the like by means of gunning processes and many such compositions have been known. In general, with reference to the manner of application, there are two main classes of gunning compositions: those which are applied as slurry mixes and those which are applied as the so-called dry gunning mixes. In the former, the refractory composition and usually the bonding component or components are premixed in a tank with sufficient water to provide a slurry for conduction through a conduit to a gunning nozzle and projection therefrom onto the furnace part to which the material is to be applied. Such slurry mixes are made up usually with from 20% to 35% of water. In the dry gunning mixes, on the other hand, the granular refractory material, usually in admixtures with the bond, is conveyed through the conduit by means of air to the gunning nozzle where it is then thoroughly and intimately mixed with the desired amount of water to form the bond upon impact in place on the furnace wall or other part, and in this instance usually between 5% and 10% of water is added. The slurry gunning method is much the less expensive of the two and it is generally applied for maintenance work, that is, for the application of thin coatings of usually not over a half- or a quarter-inch in thickness to furnace parts in order to restore slightly or less highly damaged or eroded areas. The dry gunning operation, however, is in general more expensive, requires a fast-setting bond and is applied for deep or extensive repairs in a furnace because this method generally provides denser and stronger gunned masses in place in the furnace.

As metallurgical operations have become more sophisticated, the temperatures of operation have increased and therefore the demands upon the refractories have also increased. This has led to the emplacement of more and more highly refractory materials as furnace linings; and particularly to the use of higher magnesia products, such as those containing more than 95%, and, for instance, as high as 98% or more, MgO. These high-magnesia masses in particular have posed problems with regard to gunning repairs because, particularly where the magnesium oxide content of the heat-exposed or wear face of the lining rises above 97% or thereabouts, the gunning mixes heretofore known in the art have not seized onto and adhered well to such refractory surfaces and have exhibited an excessive amount of slump or sliding from the surface into which they are gunned. They have not, in other words, formed a firm uniform, refractory repair surface.

It has now been found that this slump problem is overcome by the composition of the present invention; and in addition, the composition of the present invention can be made up into slurry or maintenance mixes and then applied with a slurrying amount of water to a high magnesia surface such as those described above as giving particular problems with prior art compositions; and will exhibit very little rebound, providing good adherence of the gunned material to the high magnesia surface and a good repair coating.

Thus, this invention relates especially to the production of a refractory composition suitable for gunning as a slurry mix, that is with the incorporation of sufficient water to form a slurry which is then forced through a nozzle and projected onto a furnace wall, such a composition consisting essentially of granular material selected from the group chromite, periclase and mixtures of chromite and periclase with each other, and a bonding component comprising from 1% to 5% of a hydrated alkali metal borate, such as hydrated sodium tetraborate, and from 1% to 5% of a plastic swelling clay, such as bentonite.

The granular material such as chromite, periclase or mixtures of the same is employed in the usual grain sizing suitable for projection through a gun, as known to this art. In one suitable range of composition, there is employed from 5% to 100% periclase grain material, the remainder of the refractory grain material being chromite. In one advantageous admixture, there is employed about 50% chromite and about 50% periclase material, the particles substantially all passing a 35 mesh including about 25%, based on the total granular material, or periclase passing 100 mesh, of which a major portion or over 50% passes 325 mesh.

DETAILED DESCRIPTION OF THE INVENTION

The periclase or magnesia which is employed as grain material in the present invention can be non-plastic magnesia particles of any type, such as periclase, deadburned magnesite or deadburned magnesia. One such magnesia which has been found useful herein is that obtained from sea water in the known manner by treatment thereof with dry calcined dolomite, followed by washing, filtering and firing of the magnesium hydroxide obtained by such treatment, if desired with the addition of a sintering aid in a small amount, to give a periclase having the following typical chemical analysis: 2.1% $SiO_2$, 1.1% $R_2O_3$ (including $Fe_2O_3$, $Al_2O_3$, $B_2O_3$, $Mn_2O_3$, and $Cr_2O_3$), 1.1% CaO, and 95.7% MgO (by difference). However, other types of periclase grain or magnesite grain can be employed, suitably containing at least 85% MgO on the fired basis. Desirably, the periclase or magnesia component is of a particle size substantially entirely passing through a 35 mesh screen.

The cromite employed herein can be of any suitable refractory type, such as Masinloc or Philippine chromite, Transvaal, Turkish, Rhodesia or other chromite. This chromite material is suitably employed in particle sizes substantially entirely passing 35 mesh; and in one suitable embodiment the chromite component in a chromite periclase mix, for instance, entirely passes through a 40 mesh screen.

The borate material employed herein is an alkali metal salt of boric acid and it is employed in an amount of from 1% to 5% based on the total weight of the composition, as set forth hereinabove. A fully hydrated alkali metal borate which has proved very useful in this invention is borax, that is, $Na_2B_4O_7 \cdot 10H_2O$; and other suitable borates are $Na_2B_4O_7 \cdot 5H_2O$, and anhydrous borax. However, other alkali metal borates are useful herein. For optimum results the borate is a hydrated sodium borate employed in an amount of from 1% to 3%.

The swelling clay which is employed herein a montmorillonite type clay, such as bentonite, which swells in contact with water. It has been fouid that the alkali metal borate enhances the swelling characteristics of the clay, particularly bentonite, and this result is most marked in the presence of such a borate as sodium tetraborte mentioned above. The enhanced swelling characteristics of this combination of montmorillonite clay and hydrated alkali metal borate results in excellent adhesion of the gunning mix to the surface upon which it is gunned, particularly to the surface of a high magnesia brick, for instance. As noted above, it has been a problem with prior art gunning mixes that, especially in attempting to gun onto a high magnesia brick surface, e.g. a brick containing over 95% MgO, adherence has not been good and there has been excessive rebound or slumping off of the gunning mix. This is effectively overcome by the slurry mix of the present invention which exhibits very high retention of the mix on such a high magnesia brick surface, where as little as only about 5% rebound has occurred. The combination of sodium borate and bentonite, in particular, has been found to provide optimum results according to the present invention. The clay is used in an amount of from 1% to 5%, and for best results in an amount of from 1% to 3%, based on total weight of the mix.

In the process of gunning into a furnace according to the present invention, a mixture of periclase, chromite or admixed periclase and chromite grains of suitable particle sizing for gunning mixes as is usual in this art, is made up and is admixed in a gunning tank with the hydrated alkali metal borate and the swelling clay of the amounts and types disclosed herein, and sufficient water is incorporated to make a gunnable slurry, usually, for example, from 20% to 30% of water being added and thoroughly admixed with the grain and bond composition. When a homogeneous mixture has been obtained, the material is fed to a gun and sprayed or gunned onto the furnace wall or bottom or site of use.

It is among the advantages of the present invention that the present composition can be gunned onto a high magnesia surface, containing at least 95% MgO, and suitably it can contain 97% to 98% or more MgO, and the gunned material will adhere well and bond well thereto, providing a stable coating over the gunned surface. It is a further advantage of the present invention that a high periclase mix can be successfully slurried and due to the presence apparently of the sodium borate, no substantial amount of hydration of such periclase takes place so that the mass, as gunned into place, is not contaminated with a substantial amount of hydrated magnesia; and the final refractory product is of good strength and density. It is a still further advantage that there is very little rebound when gunning the material of the present invention, for example, as little as 5% thereof when a furnace wall is gunned. It has been found to be a particular advantage of this mix that, so to speak, it holds together well during gunning, i.e. very little dusting occurs such as has been experienced with other bonding systems in some instances.

The example below illustrates a very advantageous embodiment of a mode of carrying out the present invention.

EXAMPLE

A refractory composition is prepared containing 50% of periclase grain of particle sizing all passing through a 40 mesh screen and 50% thereof is ball-milled, 50% of this latter amount passing through 325 mesh, this periclase having a composition as given below; and 50% Masinloc chromide ore of a sizing entirely passing 35 mesh, 80% of which passes through a 40 mesh screen, so that 40% of the total as chromite is minus 40 mesh. In other words, all of the refractory oxide particles are finer than 35 mesh. The periclase is of the following typical chemical analysis: 2.1% $SiO_2$, 1.0% CaO, 0.3% $Cr_2O_3$, 0.3% $Al_2O_3$, 0.5% $Fe_2O_3$, and 95.8% MgO (by difference). The chromite is of the following typical composition: 29.9% $Cr_2O_3$, 5.5% $SiO_2$, 27.9% $Al_2O_3$, 14.3% $Fe_2O_3$, 0.8% CaO, and 21.6% MgO. The refractory oxide grains are thoroughly mixed to make a homogeneous composition and there is admixed therewith 2% of borax, i.e. sodium borate decahydrate, and 1.5% of bentonite, these percentages being based on the total weight of the mix. The admixture is conveyed to a furnace site and is there admixed in a slurry gun tank with about 33% of water to form a homogeneous aqueous slurry. This slurry is then fed through a nozzle and projected onto a furnace wall consisting of high purity magnesia brick containing about 98% magnesium oxide, which exhibited considerable erosion on the wear face. The mix gunned with only about 5% rebound, adhered well to the furnace wall without any visible slumping or sliding and the furnace was operated for up to 4 heats without further repair in contrast to the necessity for gunning after every heat where there was employed a like gunning mix, except that sodium silicate was used instead of borax.

It will be understood that this composition can also be employed in a dry gun operation where water is admixed at the nozzle, the refractory composition being fed to the nozzle by an air conveyance stream, and that enhancement of the swelling of the clay and better adherence of the composition to the gunned wall is also obtained. However, the advantages of this invention are exhibited more completely in the slurry mixes such as exemplified above. Where an all-periclase mix is to be dry gunned, however, the composition according to the present invention is useful.

The screen sizes as shown herein are Tyler screen sizes, for example, 100 mesh corresponding to a mesh opening of 149 microns, the Tyler screen sizes being described in Chemical Engineers Handbook, John H. Perry, editor-in-chief, 4th edition, 1963, published by McGraw-Hill Book Company at pp. 21–51. In conformity with common practice in reporting chemical analyses of refractory materials, the proportions of various chemical constituents present in a material are given as though each of the constituents were present as a simple oxide. Thus, the magnesium constituent is reported as magnesia, MgO, the silicon constituent is silica, $SiO_2$, and so forth, although some magnesia and silica may be present as magnesium silicate, for example. It will be understood that the above description and examples have been given for purposes of illustration only and that various modifications can be made therein without departing from the spirit and scope of the appended claims. Parts and percentages are by weight unless otherwise indicated.

Having now described the invention, what is claimed is:

1. In a refractory composition adapted to placement by slurrying with water and projection through a gunning nozzle and consisting essentially of refractory grain selected from the group consisting of magnesia, chromite and admixtures of magnesia and chromite with each other, a plasticizer and a bonding agent, the improvement wherein said bonding agent consists essentially of from 1% to 5% of hydrated alkali metal borate and said plasticizer is from 1% to 5% of a plastic swelling clay.

2. A composition as in claim 1 wherein said alkali metal borate is sodium borate.

3. A composition as in claim 2 wherein said sodium borate is hydrated.

4. Composition as in claim 3 wherein said hydrated sodium borate is borax.

5. Composition as in claim 1 wherein said plastic swelling clay is montmorillonite clay.

6. Composition as in claim 1 wherein said clay is bentonite.

7. Composition as in claim 4 wherein said borax is present in an amount of 1% to 3%.

8. Composition as in claim 6 wherein said bentonite is present in an amount of 1% to 3%.

References Cited

UNITED STATES PATENTS

| | | | |
|---|---|---|---|
| 2,389,538 | 11/1945 | Pavlish et al. | 106—38.9 |
| 2,999,759 | 9/1961 | Heuer | 106—58 |
| 3,093,458 | 6/1963 | Demaison | 106—59 |
| 3,184,321 | 5/1965 | Heuer et al. | 106—58 |
| 3,193,402 | 7/1965 | Rusoff et al. | 106—58 |
| 3,233,015 | 2/1966 | Davies | 264—30 |
| 3,257,217 | 6/1966 | Van Dreser et al. | 106—58 |
| 3,360,388 | 12/1967 | Neely | 106—59 |

JAMES E. POER, Primary Examiner

U.S. Cl. X.R.

106—59, 66